Nov. 25, 1952 — T. P. HALL — 2,619,301
FLIGHT COMPONENT FOR GROUND VEHICLES ADAPTED TO BE AIRBORNE
Filed Feb. 2, 1948 — 3 Sheets-Sheet 1

Inventor
Theodore P. Hall
Attorney

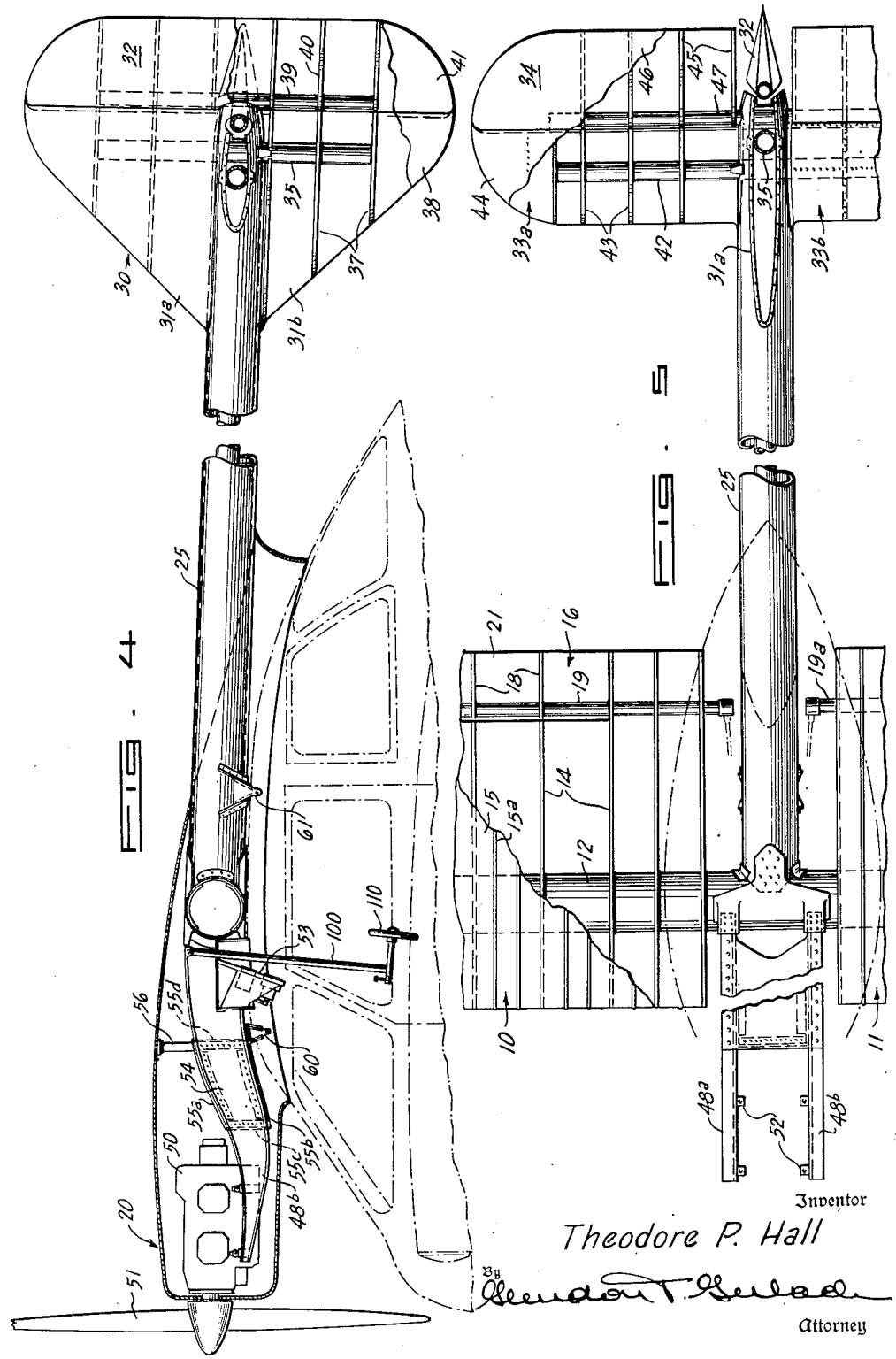

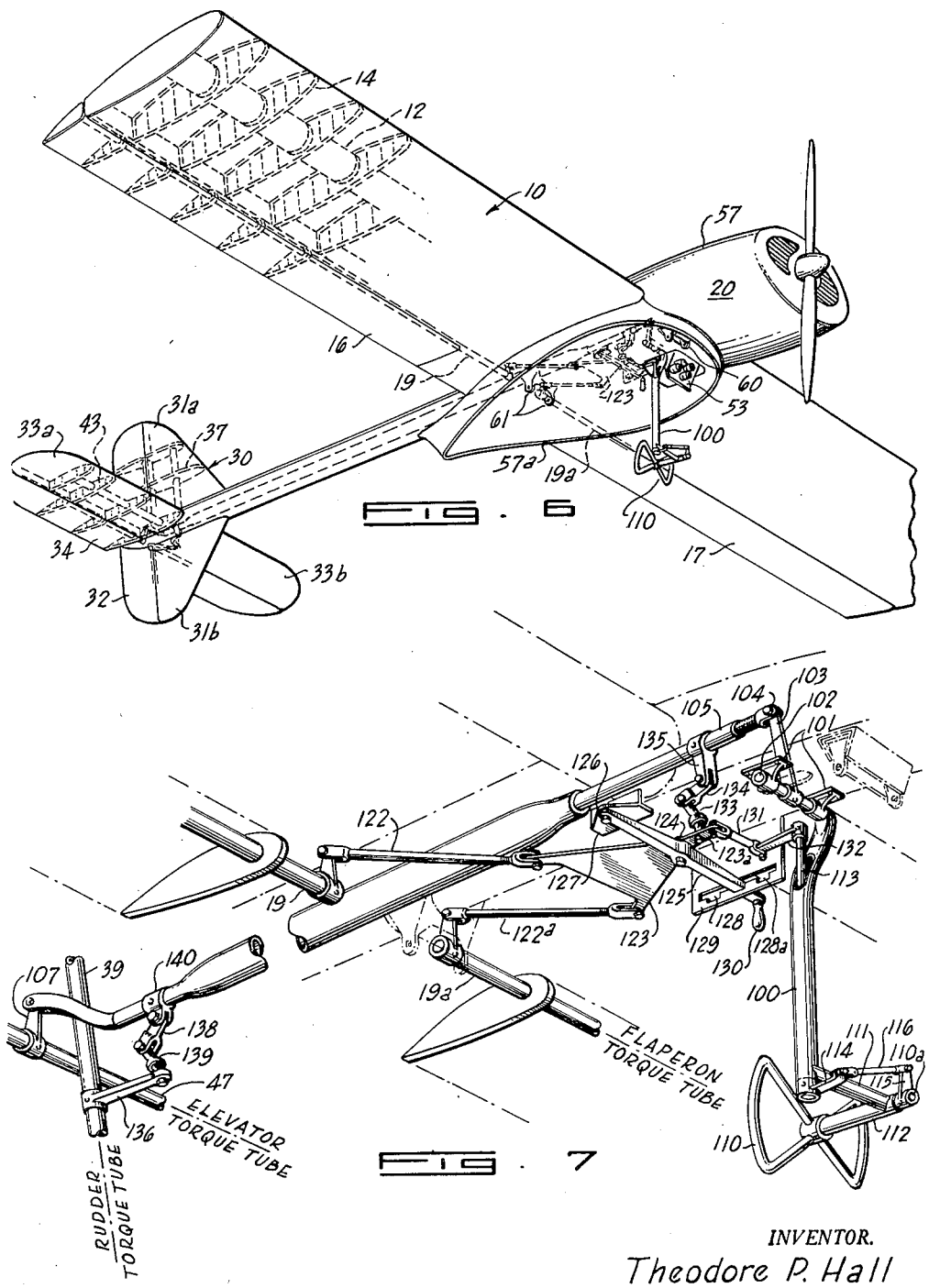

Patented Nov. 25, 1952

2,619,301

UNITED STATES PATENT OFFICE 2,619,301

FLIGHT COMPONENT FOR GROUND VEHICLES ADAPTED TO BE AIRBORNE

Theodore P. Hall, San Diego, Calif.

Application February 2, 1948, Serial No. 5,737

4 Claims. (Cl. 244—2)

This invention relates to a novel unitary flight component adapted to be releasably attached to a ground vehicle to permit it to be airborne of the type generally described and claimed in my co-pending application, Serial No. 763,859, filed July 26, 1947.

The utility of flying automobiles is well recognized and in striving to effect a vehicle of this type having a maximum of efficiency both as an aircraft and as a ground vehicle, troublesome structural problems are encountered by reason of the fact that the design criteria for aircraft are radically different than for automotive vehicles. In the design of aircraft it is particularly essential to minimize gross weight and reduce overall dimensions in order to obtain optimum performance. It has been found necessary in prior proposals of this type of flying vehicle to compromise the design of the automotive vehicle and complicate its operation and control, in order to provide the necessary elements for the structure and control of the assembly when airborne.

The present invention contemplates a completely unitary flight component adapted to be releasably attached to a ground vehicle in such a manner that the gross weight of the assembly is within practical limits as a useful airplane, and in which the flight controls are so arranged that they are completely independent of the controls necessary to operate the ground component. Earlier proposals of this character have combined their flight and automotive controls and instruments in such a manner that operation of the vehicle as an airplane or as an automobile has been complicated by the presence of unfamiliar or unnecessary controls when in one arrangement or the other. At the same time, the interdependency of the control systems in prior designs has complicated the conversion of the vehicle from an airplane to an automobile or vice-versa, and obviously increases the possibility of failures and accidents due to improper rigging or mal-functioning of the controls.

The primary object of the present invention therefore is to provide a novel unitary flight component adapted to be releasably attached to a ground vehicle to permit it to become airborne.

A further object of the invention is to provide a unitary flight component adapted to be releasably attached to a ground vehicle, in which the arrangement and configuration promotes simplicity of manufacture and structural efficiency.

A still further object of the invention is to provide a flight component having aerodynamic characteristics equivalent to that of conventional aircraft when attached to a ground vehicle adapted to be airborne.

Still another object is to provide a flight component adapted to be releasably attached to an automotive vehicle in which the flight controls, engine controls, instruments, and other equipment necessary for flight are all supported in such a manner as to be completely independent of the automotive controls.

Another object of this invention is to provide a flight component adapted to be releasably attached to a ground vehicle in such a manner that the operations of attaching and releasing the flight component to the ground vehicle may be accomplished conveniently and with a minimum of effort.

Other objects of the invention and its various characteristics and advantages will be readily apparent from consideration of the following detailed description and drawings which form a part of this disclosure, and in which like numerals of reference denote corresponding parts throughout the several views.

The invention consists in the several novel features which are hereinafter set forth and are more particularly defined.

In the drawings:

Figure 4 is a side elevation of the flight component of this invention with certain portions broken away to more clearly illustrate the arrangement of the structure and principal elements;

Figure 5 is a top view of the flight component with certain portions broken away for the purpose of clarification;

Figure 6 is a perspective of the flight component illustrating the general arrangement of the flight control system;

Figure 7 is an enlarged perspective of the flight control system with certain portions broken away for the purpose of clarity.

Figure 1:
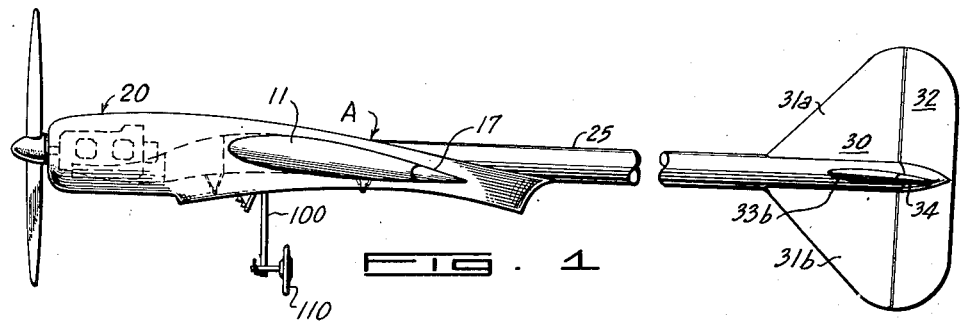
Figure 1 is a side elevation of a flight component constructed in accordance with the present invention.
Figure 2:
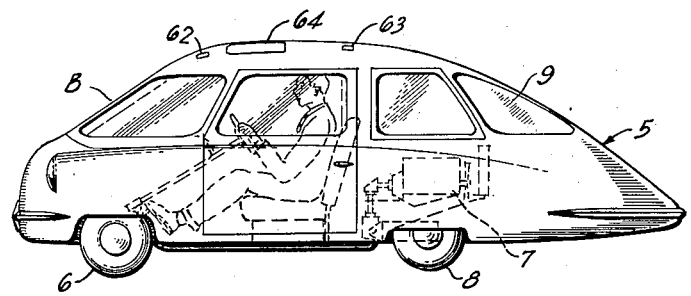
Figure 2 is a side elevation of a ground vehicle especially adapted for use with the present invention.
Figure 3:
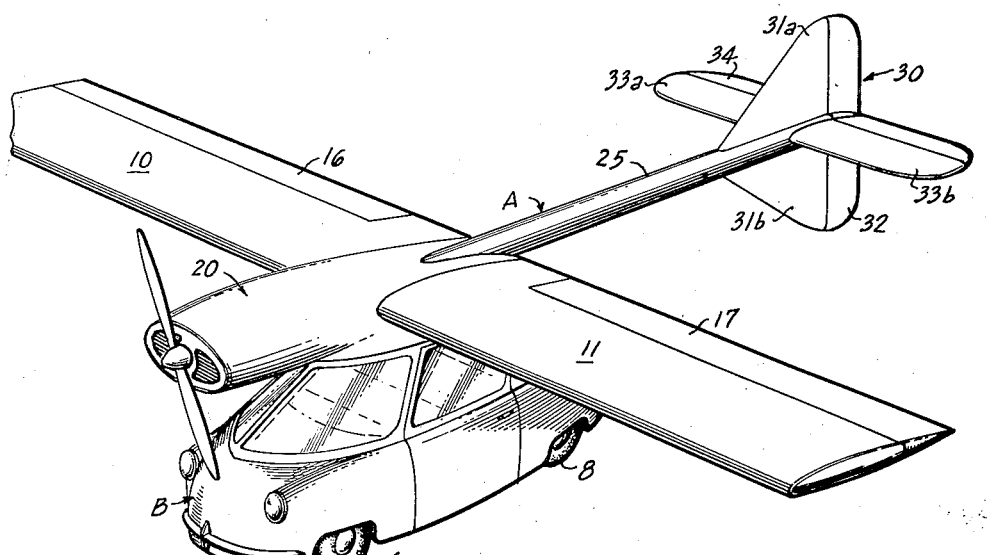
Figure 3 is a perspective of the flight component assembled to the ground vehicle illustrated in Figure 2.

The invention consists essentially of a flight component A as illustrated in the drawings designed and constructed to be releasably attached to a suitable ground vehicle B to permit it to become airborne, as shown in Figures 1, 2, and 3.

The flight component contemplated by this invention is adapted for use with a wide variety of ground vehicles, particularly of the automotive type. A preferred form of such a vehicle is described and claimed in my co-pending application Serial No. 783,543, filed November 1, 1947. The use of this type of vehicle in the present disclosure is for reference purposes, and is not to be considered as limiting the scope of this invention in any manner.

As illustrated, the automobile unit B is arranged for a driver and passenger in conventional side-by-side relationship, but if desired other arrangements may be employed accommodating additional passengers or seats other than the pilot's may be omitted and provision made for various dispositions of cargo. The automotive unit may be designed to serve a number of purposes, for example, as a light delivery vehicle, or as an armored, reconnaissance, or ambulance car for military purposes. The principal objective, however, is to provide a safe, comfortable vehicle having the combined utility of the conventional automobile and adapted to become airborne. To this end, the automotive vehicle is provided with an enclosed body 5, a pair of forward steerable wheels 6, and a rearwardly disposed engine 7 for driving the vehicle through ground engagement of a pair of drive wheels 8. The body portion 5 is of streamlined shape and is provided with windows 9 to permit optimum visibility. The external dimensions of the body 5 are somewhat less than for conventional automobiles of the same general capacity this being made possible without an attendant decrease in the internal dimensions because of the arrangement of the structure and elements as explained in the aforementioned co-pending patent application. The reduction in overall size and weight of the vehicle improves its maneuverability as an automobile, and of course reduces drag when airborne.

Because of the arrangement and the use of materials having high strength-weight ratios, the gross weight of the automobile is kept low in comparison to that of comparable automobiles of present design. As a result of this reduction in gross weight, a smaller automotive power plant is permissible to provide equivalent speed and power performance, and this in itself contributes to weight reduction as well as economy of operation. An automotive vehicle as contemplated for use in connection with the present invention will provide comparable performance when powered with an engine of 25–30 rated horsepower, as against 85–100 horsepower engines used in present conventional automobiles.

The controls of the automotive vehicle B are identical in location, operation and function as in conventional automobiles to eliminate need for additional training in the use of the vehicle as an automobile and to fully utilize the normal reactions of the trained automobile driver. They include a steering wheel, a foot accelerator, a clutch pedal for response to actuation by the driver's left foot, a hand actuated gear shift, and a brake pedal located for operation by the right foot of the driver.

While the automotive vehicle described is comparable in every way with conventional performance specifications for a light automobile, it also conforms to the practical requirements for the passenger and load carrying portions of a light airplane, and is suited aerodynamically and from a weight standpoint to become airborne when utilized in conjunction with the flight component A forming the subject matter of this invention.

Having particular reference to Figure 1, 4, 5 and 6, the flight component A is shown consisting essentially of a main lifting surface comprising wings 10 and 11, a cowled tractor-mounted power plant 20, a tail boom 25, and an empennage 30.

The wings 10 and 11 are supported by and formed upon a primary tubular wing spar 12 that extends transversely of the airplane and from wing tip to wing tip. While other forms of this element may be employed without departing from the spirit of this invention I have found that a constant diameter and thicknes tube serving as the spar 12 provides adequate strength for the purpose and contributes to simplicity of design, and ease of manufacture. A series of suitably spaced airfoil-shaped ribs 14 are fastened as by riveting or welding to the spar 12, and suitably spaced thereon in a chord-wise direction to form the wings 10 and 11 when provided with a skin 15 which is preferably of sheet aluminum or Duraluminum and which may be reinforced to support bending loads by integrally formed beads 15$^a$.

A pair of "flaperons" or control surfaces 16 and 17 forming the trailing edges of the wings 10 and 11 are pivotally supported thereby to permit selective vertical movement around a horizontal axis.

The control surfaces 16 and 17 are shaped as continuations of the wing airfoil section, and are formed by a series of sparwise ribs 18 fastened to a pair of torque tubes 19 and 19$^a$ and covered with a sheet-like skin 21.

The tubular tail boom 25 is securely attached at its forward end to the mid-point of the wing spar 12 and extends rearwardly to support the empennage 30 and serve as a housing for the empennage controls as will be decribed.

The empennage 30 consists essentially of a pair of vertical airfoil shaped fin members 31$^a$ and 31$^b$, a rudder 32, a pair of horizontal stabilizers 33$^a$ and 33$^b$, and an elevator 34.

A vertically disposed tubular spar 35 projects above and below the rearward end of the tail boom 25, and is rigidly secured thereto as by riveting. A series of airfoil shaped ribs 37 are supported on the upper and lower projections of the spar 35, to which is fastened a skin 38 forming the fin members 31$^a$ and 31$^b$. The rudder 32 forms an aerodynamic trailing edge of the fin members 31$^a$ and 31$^b$ and is adapted for pivotal movement in relation thereto. A rudder torque tube 39 is journalled in suitable bearings supported on the members 31$^a$ and 31$^b$ and acts as a structural spar for the rudder 32 in combination with ribs 40 and a skin 41.

The horizontal stabilizers 33$^a$ and 33$^b$ are supported by a tubular stabilizer spar 42 which projects through and on either side of the tail boom 25 and is rigidly secured thereto. The airfoil shaped stabilizers 33$^a$ and 33$^b$ are formed thereon by a series of sparwise ribs 43 fastened to the projecting ends of the spar 42 and to a skin member 44.

The elevator 34 acts as a trailing edge for the horizontal stabilizers 33$^a$ and 33$^b$, and is formed by a series of ribs 45, covered by a skin 46, rigidly secured to an elevator torque tube 47 which is supported on suitable journals mounted on the horizontal stabilizers 33$^a$ and 33$^b$, in such a manner as to be pivotal around a horizontal axis in relation thereto.

A pair of forwardly projecting cantilever engine bearers 48a and 48b are rigidly secured in laterally spaced relation to the wing spar 12 on either side of the fore and aft center line of the flight component B and serves primarily to support a power plant 20 consisting of an engine 50 and a tractor type propeller 51 driven therefrom.

By this means, the loads of the power plant are transmitted to the wing spar, at its mid-point through the engine bearers 48a and 48b. The engine is supported at the forward ends thereof by a plurality of lugs 52.

The engine 50 is of sufficient power to provide useful load and speed characteristics of the assembly when the flight component is attached to the automobile vehicle with its occupants, cargo, etc., and is preferably though not necessarily of opposed cylinder air-cooled aircraft type.

The engine 50 is provided with conventional induction and ignition systems and the usual accessories including starter, generator, controls, and instruments. All of the controls including throttle, mixture control, starter button, etc. and the instruments including oil and fuel pressure gauges, temperature gauge, etc. are mounted on a control and instrument panel 53 supported by the engine bearers 48a and 48b, downwardly and inclined toward the front of the assembly so that it is clearly visible and accessible to the operator when the flight component is in assembled and operative position with the automotive vehicle B.

An integral fuel tank 54 is formed between the engine bearers 48a and 48b by plates 55a and 55b riveted respectively across their upper and lower flanges, and a pair of bulkheads 55c and 55d forming end plates so that the weight of the tank and fuel is transmitted through the engine bearers 48a and 48b to the mid-point of the wing spar 12. A fuel filling pipe 56 is provided for the fuel tank, and suitable connections to the induction system of the engine 50, are also provided.

A sheet metal shroud 57 serves to cowl the engine 50 and to streamline the center section of the wing, its lower edge 57a being contoured to fit the roof portion of the automotive vehicle B when the flight component A is positioned in assembled relation thereto, and to provide a fillet between the two units promoting improved appearance and aerodynamic efficiency.

An important feature of this invention is that the principal loads of the flight component A are transmitted through the tubular wing spar 12, the tubular tail boom 25 and the cantilever type engine bearers 48a and 48b, and are concentrated at their intersection. This arrangement is particularly advantageous for the attachment of the automotive component A at the same general location. This is accomplished through a pair of laterally spaced forward attachment fittings 60, which are fastened to the lower side of the engine bearers 48a and 48b, and a pair of laterally spaced rear attachment fittings 61 supported by the tail boom 25, in such a manner that effecting a positive connection with the automotive vehicle B by means of the attachment fittings distributes the load of the automotive vehicle to the central structure of the flight component A in a structurally efficient manner.

Releasable attachment of the flight component A to the automotive vehicle B is accomplished by integral fittings on the frame of the automotive vehicle B cooperating with the pairs of attachment fittings 60 and 61, a preferred embodiment being shown in detail in my aforesaid co-pending applications. This fitting arrangement effects a positive but releasable connection between the flight component A and the automotive component B and serves also to locate positively the one with respect to the other. In the connecting operation, the flight component A is suspended on jacks or by means of a hoist, and the automobile B is driven or positioned under it so that the forward and rear attachment fittings 60 and 61 are located over attachment openings 62 and 63 (Figure 2) provided in the top of the body 5. The flight component B is then lowered so that the attachment fittings 60 and 61 engage the automotive vehicle fittings and are locked thereto.

With the flight component A assembled to the automobile component B, a vehicle is formed which may be characterized generally as a high-wing tractor monoplane, a type of aircraft which is particularly adapted for moderate performance passenger travel because of its stability, visibility, and advantageous landing and take-off characteristics. In aircraft of this type, it is essential to good stability and flight performance that the center of gravity be located as low and as near to the center of pressure of the wing as possible. In available airfold sections applicable to the present invention the center of pressure of the wing occurs at or near 30% of the mean aerodynamic chord. I have found that with the arrangement described herein, the center of gravity of the combined automobile-airplane is located at about 27% mean aerodynamic chord when the vehicle is fully loaded and is sufficiently low to provide optimum flight characteristics. The rearward location of the motor 12 in the automobile component B to oppose the forward location of the flight engine 50 advantageously positions two of the principal loads and tends to effect a desirable location of the center of gravity therebetween.

A further requirement of weight distribution is that the center of gravity location of the aircraft does not vary considerably in the event of different arrangements or change in the disposable load, i. e., passengers, baggage, and fuel. In the present arrangement, since these elements are located at or near the center of pressure of the wing, I have found it possible to limit the horizontal movement of the center of gravity to within the limits of good aircraft design.

A further important feature of the present invention which is here particularly stressed is the independence of the control system of the flight component A from that of the automobile component B. To effect this independence a two-control system is employed in place of the more conventional three-control system wherein aileron, rudder and elevator surfaces are provided under the control of independent actuating systems. In the latter case, it is usual to actuate the ailerons and elevators for lateral and longitudinal control by differential movement of a control stick or wheel, and to actuate the rudder for directional control by foot pedals. Since the foot pedal positions of the present invention are utilized for the clutch and brake control of the automobile unit, I prefer to utilize a flight control system in which the rudder and ailerons are co-ordinated in such a manner that lateral and directional controls are combined and actuated through a single system. By so providing, complete flight control can be provided from a single overhead type control column 100 which depends from and is supported by the structure of the flight component A in such a manner that when the flight component A is in assembled relation to the automotive unit B, the control column 100 projects through a normally covered opening 64 in the body 10 and will be positioned in proper relation to the operator to permit complete and effective flight control of the vehicle.

The operation and function of two-control flight systems are well understood in the art, and the specific form thereof shown and described herein exemplifies an embodiment which provides advantages which are particularly evident in combination with other features of this invention. However, it is not to be understood that the invention is limited to the particular flight control systems shown since there are many forms of combined flight control systems which may be used and are contemplated as within the scope of this invention.

With particular reference to Figure 6, the wings 10 and 11 are shown provided with control surfaces 16 and 17 pivotally connected at the trailing edge thereof and serving to provide lateral control of the airborne vehicle when moved differentially, i. e., as ailerons. To eliminate the necessity of flaps or other high-lift devices, provision is made in the present embodiment to "droop" the surfaces 16 and 17, i. e., to depress them simultaneously, while at the same time permitting differential action. As is well understood and accepted in the art, control surfaces so characterized are known as "flaperons."

As stated hereinbefore, the empennage 30 consists essentially of fixed vertical fin portions 31a and 31b, a rudder 32 pivotally attached to these fin portions to provide directional control, and fixed horizontal stabilizer portions 33a and 33b supporting an elevator 34 which is adapted for vertical pivotal movement to provide longitudinal control.

The details of the system for actuating the flight control surfaces are most clearly illustrated in Figure 7. As shown, the control column 100 is suspended from bearings 101, supported on the flight component structure, for fore and aft movement about a cross-shaft 102. A lever 103 is affixed to the cross-shaft 102 for rotation therewith and is pivotally attached at its upper end through a clevis 104 to the elevator control tube 105. Rotation of the lever 103 in response to the fore and aft movement of the control column 100 moves the elevator control tube 105 longitudinally or in a fore and aft direction to rotate the elevator torque tube 47, through a bell crank 107. The elevator torque tube 47 is connected to the elevator 34 to deflect it upwards when the control column 100 is moved aft, and downwards when the control column is moved forward, to effect longitudinal control of the airborne vehicle.

Tube 105 is suitably mounted for rotative movement for operation of the rudder 32; the interconnection of tube 105 and rudder 97 will be hereinafter described. Coordinated control of the flaperons 16 and 17 and the rudder 32 is provided through a control wheel 110 which is supported to one side of the lower end of the control column 100 by a transverse support tube 111 and a horizontal fore and aft extension 112, which houses the control wheel axle 110a. A shaft 113 supported axially of the control column 100 is adapted for rotation in response to rotation of the control wheel 110 through a pair of bell cranks 114 and 115, pinned respectively to the lower end of the shaft 113 and the control wheel axle 110a, and interconnected by a link 116.

The flaperons 16 and 17 are adapted to be pivotally moved by the torque tubes 19 and 19a respectively, which tubes are operatively connected to the rearwardly projecting corners of a generally triangular plate member 123 through adjustable links 122 and 122a. The plate member 123 is pivotally supported at 124 on a transverse arm 125, one end of which arm is supported on a pivot 126, in a rigidly fixed bracket 127 and is swingable horizontally about the pivot 126. The free end of the arm 125 extends through a slot 128 in a depending fixed support bracket 129, and is provided with a control handle 130. By means of the handle 130, the arm 125 may be moved about its pivot 126 in a fore and aft direction, and may be restrained in any of a plurality of positions by dropping the arm into one or another of a series of notches 128a associated with the slot 128. By this means, the position of the triangular plate member 123 relative to the other elements of the control system may be manually adjusted.

Movement of the plate member 123 in response to manual operation of the handle 130 simultaneously depresses or elevates each of the flaperons 16 and 17 through interconnecting links 122 and 122a the same amount to change the effective camber of both wings 10 and 11 to vary their lift characteristics, as is well understood in the art; and thus this portion of the control system by the simultaneous control of the flaperons 16 and 17 provides the function of conventional flaps or other high lift devices.

To effect differential action of the flaperons 16 and 17 for lateral control, a projection 123a of the plate 123 extends forward of the pivot 124 and is pivotally connected to a link 131 which in turn is pivotally connected to a bell crank 132 carried by and rotatable with the shaft 113. Thus movement of the link 131 in response to manual actuation of the control wheel 110, rotates the triangular plate member 123 about its pivot 124 and moves the flaperons differentially, that is, one will move up as the other moves down and vice versa. The differential control of the flaperons 16 and 17 for lateral control is obtained in this system regardless of the relative neutral position of the flaperons 16 and 17 with respect to the wings, as established by the position of the lever handle 130, so that lateral control of the vehicle is obtained even when the flaperons are in the fully depressed or "drooped" position.

The lateral and directional control systems are coordinated so that flaperons 16 and 17 and rudder 32 are simultaneously operated by rotation of the control wheel 110 in such a manner that the rudder is deflected to produce a given amount of yawing or directional movement to the vehicle for any lateral movement produced by the flaperons 16 and 17, and in the proper direction. This coordination of controls is accomplished by means of a link 133 which is universally pivoted at its lower end to the projection 123a of plate 123, between the pivot point 124 and the attachment point to the link 131, and at its other end geometry of the system comprising the bell crank 135 pinned to the elevator control tube 105. The geometry if the system comprising the bell crank 135 and the links 133 and 134 is such that fore and aft movement of the control tube 105, which occurs when the elevator 34 is to be operated, merely displaces the links 133 and 134 in the same direction without affecting the position of the triangular plate member 123, while rotation of the plate member 134, which occurs when the flaperons are differentially actuated, rotates the control tube 105 without affecting its relative longitudinal position or the setting of the elevator 34.

The rudder 32 is adapted to be rotated about its vertical axis in response to rotation of the control tube 105. An operative connection is had between the rudder 32 and control tube 105 through a rudder horn 136 pinned to the rudder torque tube 39, and attachment fitting 140 fastened to the rear end of the control tube 105 and a pair of links 138 and 139 interconnecting the tube 39 and the fitting 140. The geometry of this system is such that longitudinal movement of the control tube 105 to actuate the elevators 99 displaces the links 138 and 139 without rotation of the rudder horn 136 (or the rudder 32 controlled thereby) while rotation of the control tube 105 effects rotation of the rudder horn 136 and the rudder 32 without affecting the position of the elevators 34.

It will be apparent from the foregoing description that the flight control system comprises three distinct components: (a) a longitudinal control operable by fore and aft movement of the control column 100; (b) a coordinated lateral and directional control operable by rotation of the control wheel 110; and (c) a control for changing lift characteristics operable in response to movement of the handle 130. The arrangement may be further characterized as a two-control system employing a conventional elevator for longitudinal control and a combined rudder and aileron system to produce coordinated lateral and directional movement, in which the ailerons are capable of being "drooped" to provide high-lift characteristics for take-off and landing, thus serving as "flaperons."

It is to be particularly noted that the entire flight control system is supported by the flight component A and is completely independent of the control system of the automotive component B, thus facilitating the assembly and disassembly of the vehicle, and eliminating the mechanical complications inherent in interconnected systems.

This invention also provides that the instruments necessary for flight including compass, altimeter, etc., are supported as part of the flight component A on the instrument panel 53 which is adapted to extend through opening 64 in the roof of body 5, along with control column 100, when the major components are assembled.

A unitary flight component adapted for releasable attachment to a ground vehicle has been described herein which incorporates desirable structural and aerodynamic efficiency and provides complete independency of the controls necessary for flight as well as simplicity and ease of attachment. A novel design is embodied in the present invention whereby the arrangement of the principal structural elements is advantageous to the attachment of a ground vehicle to permit the assembly to be operated as an airborne vehicle.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A unitary flight component incapable alone of controlled flight but being adapted to be releasably attached to a ground vehicle to form therewith a complete flyable aircraft, said flight component comprising a main lifting surface having a tubular wing spar, a tubular boom attached at its forward end to and supported and extended rearwardly from said wing spar, a stabilizer supported by said boom, means operatively associated with said main lifting surface and with said stabilizer for effecting aerodynamic control, a forwardly extended, cantilever engine mount attached at its rear end to said tubular wing spar in fore and aft axial alignment with said rearwardly extended boom, and an engine mounted and supported on said forwardly extended engine mount for propelling in flight a complete aircraft formed by the attachment of said component to a ground vehicle.

2. A unitary flight component incapable alone of controlled flight but being adapted to be releasably attached to a ground vehicle to form therewith a complete flyable aircraft, said flight component comprising as built-in, self-contained units thereof, a main lifting surface having a wing spar, a boom attached at its forward end to and supported from said wing spar, said boom being extended rearwardly along the fore and aft axis of the flight component, aerodynamic control means operatively associated with said main lifting surface, a forwardly extended cantilever engine mount attached at its rear end to said wing spar and being disposed in forwardly extended axial alignment with said boom, a control column mounted and supported in position depending downwardly from said wing spar and being operatively associated with said aerodynamic control means, and an engine mounted and supported on said forwardly extended engine mount for propelling in flight a complete aircraft formed by the attachment of said component to a ground vehicle.

3. In a unitary flight component of a type incapable alone of controlled flight but being adapted to be releasably attached to a ground vehicle to form therewith a complete aircraft, the combination of, a main lifting surface including a major wing spar, a tubular boom connected to and supported from said wing spar at its forward end and being extended rearwardly from said lifting surface, aerodynamic control members supported from said boom, aerodynamic control members mounted on said lifting surface, a control column movably mounted on said lifting surface and being supported from said wing spar, said control column depending downwardly from said main lifting surface, operative connections housed within said tubular boom and being operatively connected between said control column and the aerodynamic control members supported on said boom, a forwardly extended cantilever engine mount attached at its rear end to and supported from said wing spar, said engine mount being extended forwardly from said spar in longitudinal, axial alignment with said rearwardly extended boom, and an engine mounted on said engine mount as a self-contained unit of said component for propelling in flight a complete aircraft formed by the attachment of the component to a ground vehicle.

4. In a unitary flight component adapted to be releasably attached to a ground vehicle to form therewith a complete flyable airplane, a main lifting surface having a spar, means operatively associated with said main lifting surface for effecting aerodynamic control, a cantilever engine mount attached to and supported and extending from said lifting surface spar, and a power plant constituting a built-in, self-contained unit of said flight component and comprising, an engine and a fuel tank supported on said cantilever engine mount at locations thereon spaced forwardly from said spar, and a propeller in driven connection with said engine for propelling in flight the complete aircraft formed by the attachment of said flight component to a ground vehicle.

THEODORE P. HALL.

REFERENCES CITED

The following references are of record in the file of this patent:

UNITED STATES PATENTS

| Number | Name | Date |
|---|---|---|
| 1,348,548 | Dominicis et al. | Aug. 3, 1920 |
| 1,406,617 | Dalton | Feb. 14, 1922 |
| 1,855,988 | Ranasey | Apr. 26, 1932 |
| 1,869,326 | Ludlow | July 26, 1932 |
| 2,119,181 | Saulnier | May 31, 1938 |
| 2,183,323 | Moss | Dec. 12, 1939 |
| 2,316,622 | Richard | Apr. 13, 1943 |
| 2,373,467 | Frakes | Apr. 10, 1945 |
| 2,410,234 | Read et al. | Oct. 29, 1946 |

FOREIGN PATENTS

| Number | Country | Date |
|---|---|---|
| 462,904 | Great Britain | Mar. 15, 1937 |
| 559,819 | Great Britain | Mar. 7, 1944 |
| 753,850 | France | Aug. 23, 1933 |

OTHER REFERENCES

"Aero Digest" of Aug. 15, 1944; pp. 89 and 224.